United States Patent [19]
Peitz

[11] 4,456,102
[45] Jun. 26, 1984

[54] OVERRUNNING WHEEL BRAKE

[76] Inventor: Josef Peitz, Michaelstr. 31, Schloss Neuhaus-Sennelager, Fed. Rep. of Germany

[21] Appl. No.: 432,392

[22] Filed: Sep. 30, 1982

Related U.S. Application Data

[63] Continuation of Ser. No. 202,445, filed as PCT DE 79/00133, Nov. 9, 1979, § 102(e) date Jun. 25, 1980, abandoned.

[30] Foreign Application Priority Data

Nov. 10, 1978 [DE] Fed. Rep. of Germany ....... 2848744

[51] Int. Cl.³ ....................... B60T 7/20; F16D 51/46; F16D 51/60
[52] U.S. Cl. .................................. 188/331; 188/136; 188/342
[58] Field of Search ............... 188/112, 342, 343, 331, 188/332, 333, 341, 136, 140 A, 140 R, 325, 327-330, 78, 105, 106, 79.55 C, 250 A, 250 B, 250 F; 193/35, 38, 37

[56] References Cited

U.S. PATENT DOCUMENTS

| 1,873,389 | 8/1932 | Gunn | 188/331 |
| 2,221,929 | 11/1940 | Snider | 188/112 R |
| 2,251,854 | 8/1941 | Parnell et al. | 188/333 X |
| 4,363,386 | 12/1982 | Peitz | 188/331 |

FOREIGN PATENT DOCUMENTS

| 880704 | 7/1953 | Fed. Rep. of Germany . | |
| 913622 | 6/1954 | Fed. Rep. of Germany | 188/78 |
| 1176428 | 8/1964 | Fed. Rep. of Germany | 188/332 |
| 1933435 | 1/1970 | Fed. Rep. of Germany | 188/112 R |
| 2023864 | 12/1971 | Fed. Rep. of Germany | 188/332 |
| 2114659 | 10/1972 | Fed. Rep. of Germany . | |
| 2248061 | 4/1974 | Fed. Rep. of Germany . | |
| 2257893 | 6/1974 | Fed. Rep. of Germany . | |
| 2413131 | 9/1974 | Fed. Rep. of Germany . | |
| 962408 | 6/1950 | France . | |
| 1194744 | 4/1958 | France . | |
| 509084 | 11/1953 | Italy | 188/331 |
| 280163 | 4/1928 | United Kingdom | 188/332 |
| 737934 | 10/1955 | United Kingdom | 188/342 |
| 932709 | 7/1963 | United Kingdom | 188/342 |

Primary Examiner—Douglas C. Butler
Attorney, Agent, or Firm—Michael J. Striker

[57] ABSTRACT

An overrunning wheel brake has a brake drum, two brake shoes including a first brake shoe which, upon forward movement will be leading, and a second brake shoe, a bracket member provided with at least one guiding part arranged to support the first brake shoe, a tensioning member formed as an eccentric cam expanding the bracket in direction toward the drum and acting in running up direction of the first shoe, at least one incline provided on the first brake shoe in the region of its contact with the guiding part of the bracket member and forming relative to an outer curvature of the first brake shoe a wedge surface tapering in the running-up direction of the first brake shoe, an abutment member, and a displaceable pin arranged so that the brake shoes abut via the pin against one another and against the abutment member, and the tensioning member abutting with its free end against the second brake shoe via the pin.

6 Claims, 4 Drawing Figures

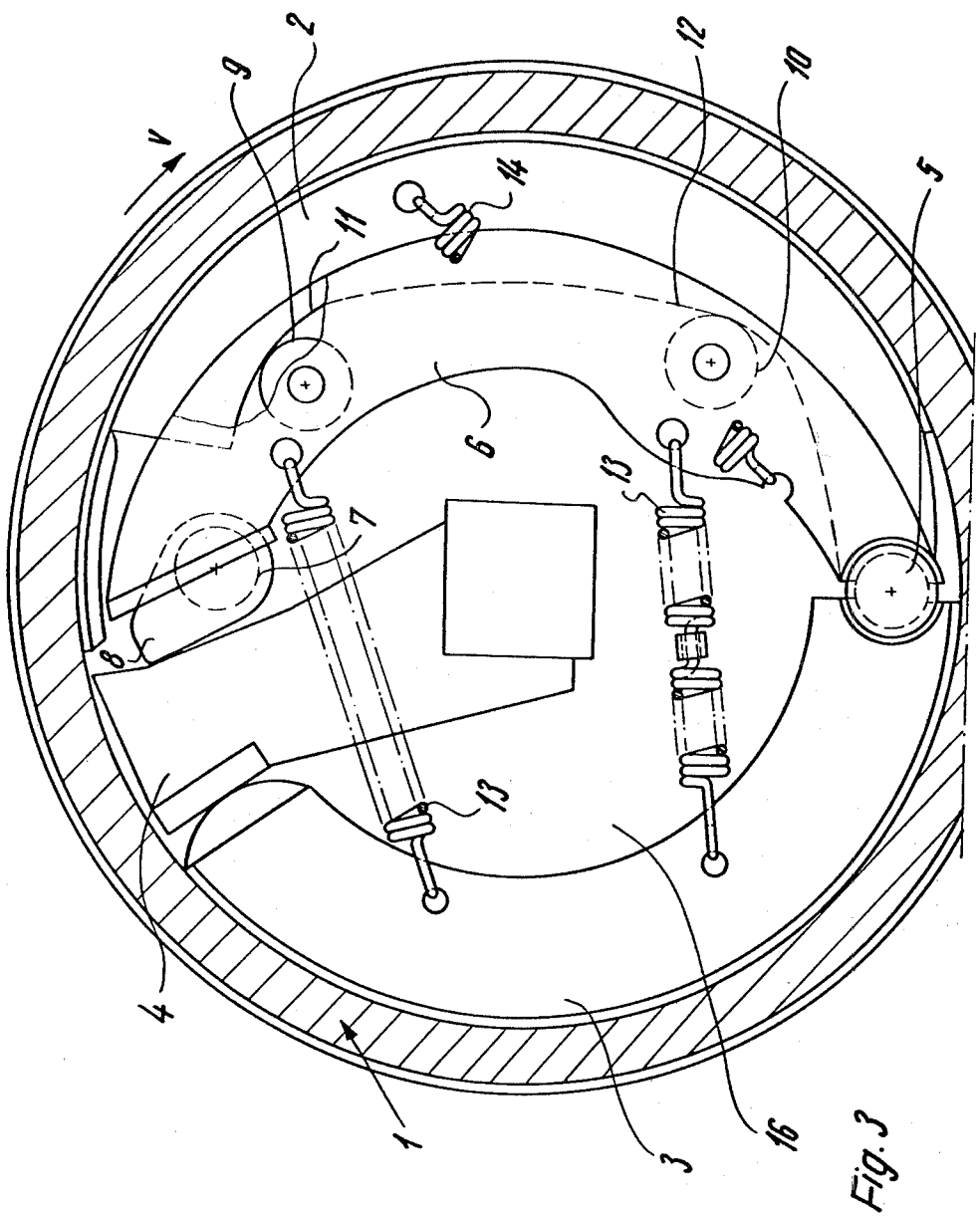

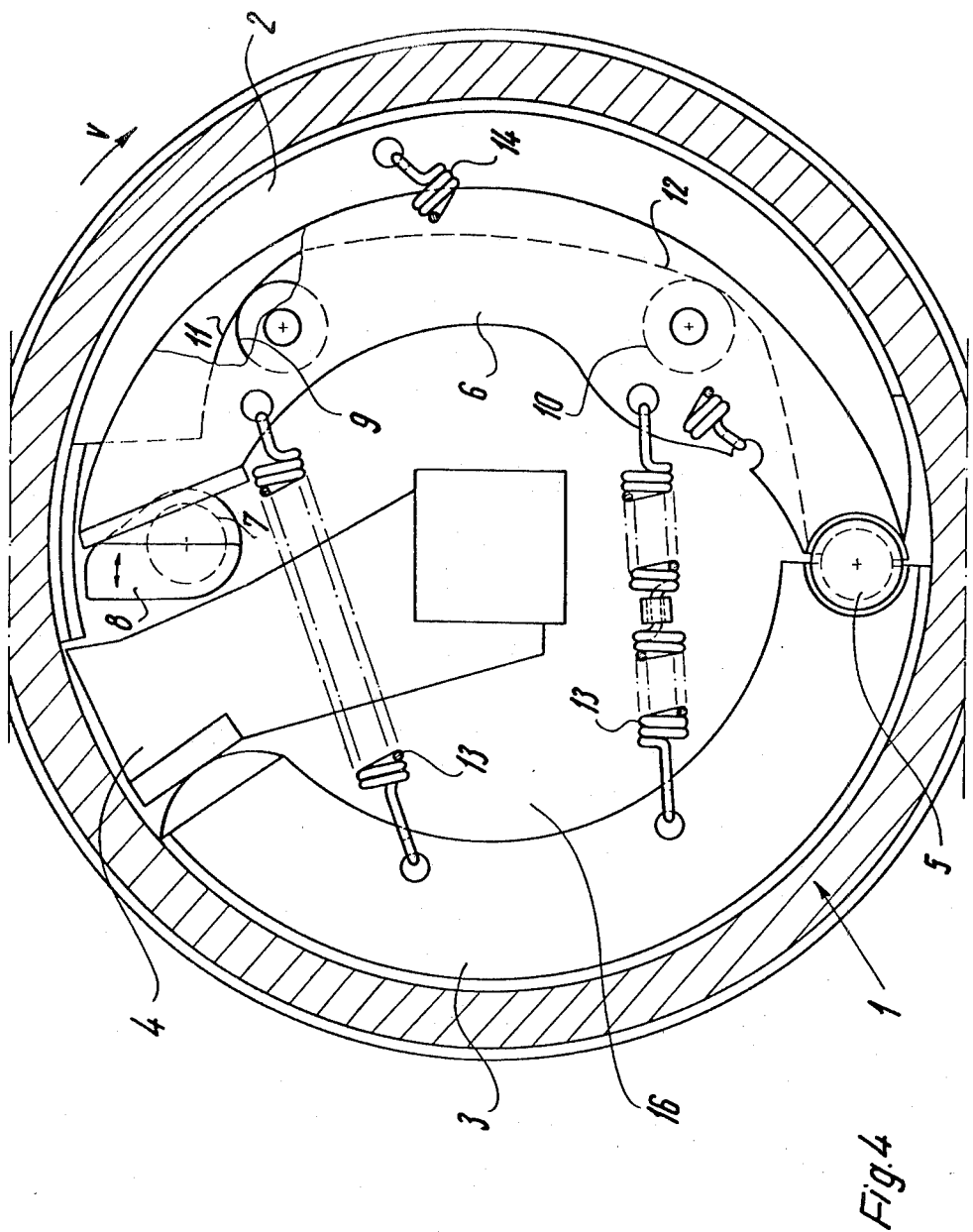

OVERRUNNING WHEEL BRAKE

This is a continuation of application Ser. No. 202,445, filed as PCT DE 79/00133, Nov. 9, 1979 § 102(e) date Jun. 25, 1980 now abandoned.

BACKGROUND OF THE INVENTION

The present invention relates to an overrunning wheel brake with two brake shoes in self-energizing arrangement.

Overruning wheel brakes of the above-mentioned general type are known in the art. Such brakes possess some disadvantages with regard to their operation.

SUMMARY OF THE INVENTION

The object of the present invention is the creation of an overrunning wheel brake of this category, generating very high braking forces in the direction of overrunning, and nearly no braking forces upon reverse motion, with adequate braking force being ensured in either direction when braking by hand.

As per invention, this object is attained by the first brake shoe which is the leading shoe during forward motion, being supported by one guide cam or guide roller or similar, appurtenant to a bracket, said bracket being expandable against the brake drum by means of a tensioning member formed by a cam eccentrically located on a shaft and acting in the running-up direction of the first brake shoe, and also by the first brake shoe being provided with inclines in all zones where it rests against guide cams or guide rollers or similar, said inclines enclosing, together with the external curvature or the brake shoe, a respective wedge surface tapering in the running-up direction of said brake shoe.

When travelling forward, such an overrunning wheel brake will rapidly generate enormously high braking forces upon overrunning of the trailer, since the first, running-up, brake shoe, after having been pressed by the bracket against the brake drum, will be drawn along in the running direction of the drum, and will even more strongly be pressed against the drum due to the action of the inclines. The self-energizing arrangement of both brake shoes will also cause the second brake shoe supported by the abutment bearing, to be firmly pressed against the brake drum, so that a balanced braking effect of both brake shoes is achieved.

When travelling in reverse, the first brake shoe is drawn along against the direction of action of the tensioning member, and it may then "run freely" along the inclines, so that practically no braking force at all is generated in this direction of travel.

Upon braking by hand, the tensioning member will be displaced even further than would be possible at the maximum distance of overrunning, so that the guide cams or similar, appurtenant to the bracket, will be displaced over the inclines for a relatively great distance. If the first brake shoe is drawn along in the direction of reverse travel, its free end will move toward the abutment bearing and will rest against it, so that adequate braking force is available for hand braking, a somewhat reduced contact pressure notwithstanding.

Should a tendency towards forward movement arise during the hand-braked state, the first brake shoe is again drawn in the direction of running up, and the brake force will further increase due to the effect of the inclines, so that an enormously high braking force is ensured also in this direction of possible travel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a section along the line III—III of FIG. 1 with brake not applied;

FIG. 4 is a section corresponding to FIG. 3, brake applied.

DESCRIPTION OF PREFERRED EMBODIMENTS

Figure 1:
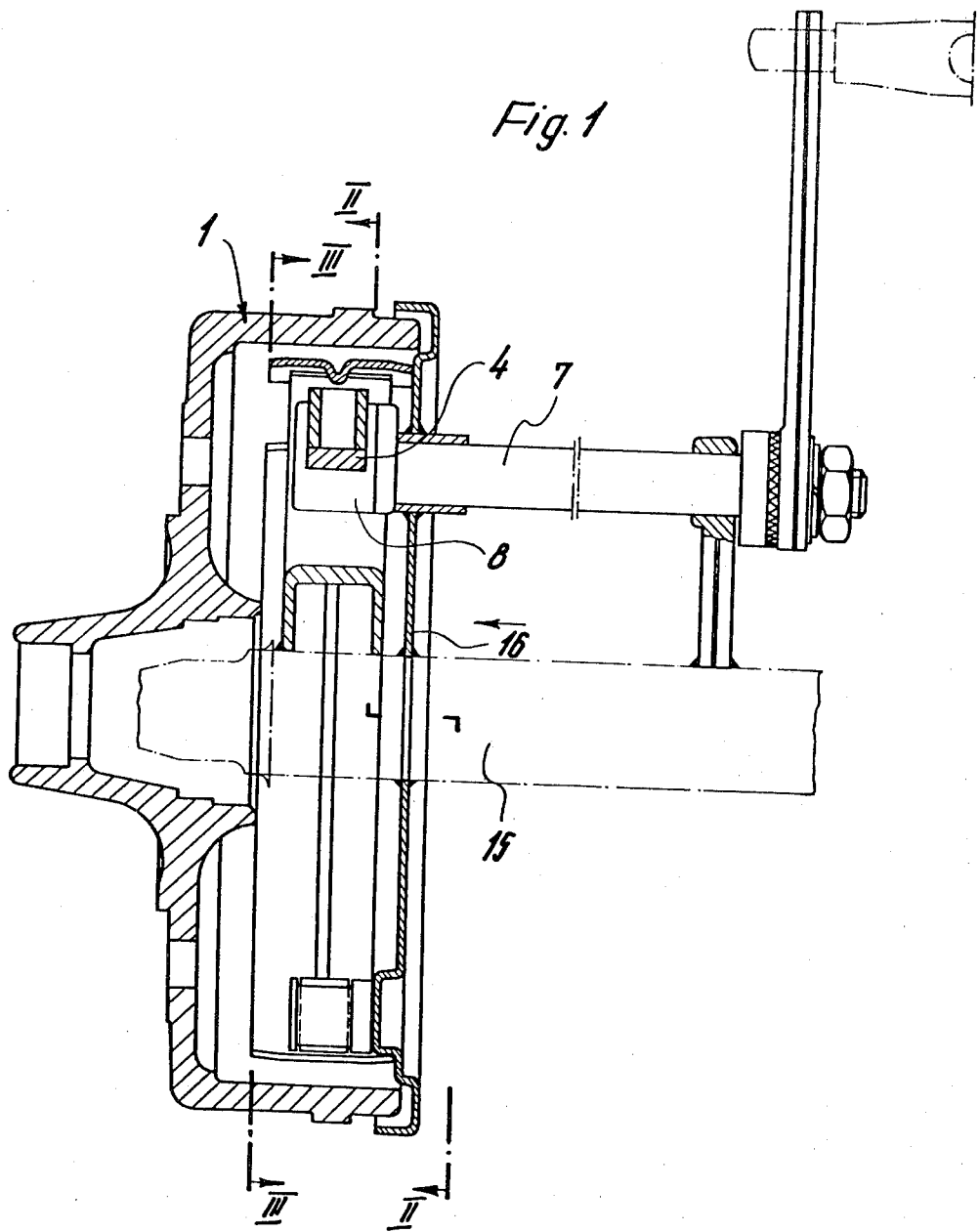
FIG. 1 is a horizontal section through an overrunning wheel brake as per invention.
Figure 2:
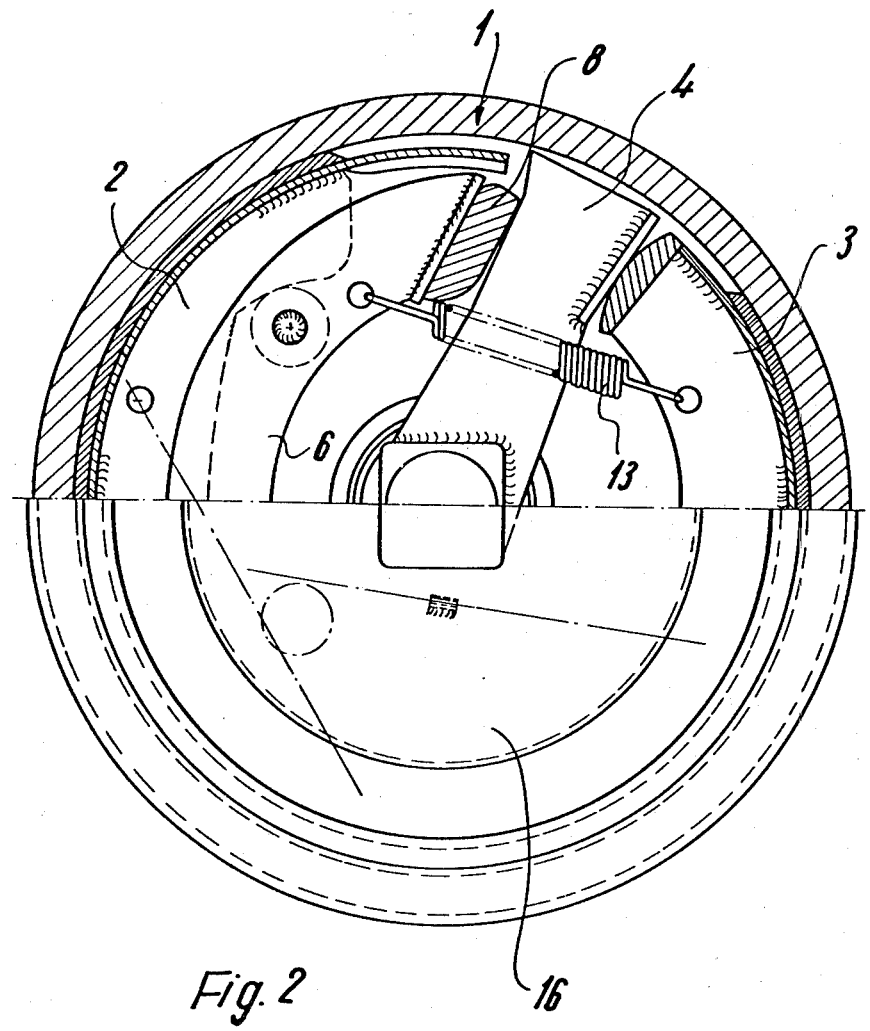
FIG. 2 is a section along the line II—II of FIG. 1.

In the overrunning wheel brake shown in the drawings, two brake shoes 2 and 3 are floatingly supported within a brake drum 1.

A pin 5, serving as support for the other brake shoe 2, is attached on the brake shoe 3 which, in turn, is resting against an abutment bearing 4.

Said pin 5 also serves to support a bracket 6, the other end of the latter facing a cam 8 eccentrically attached on the shaft 7. This cam 8 forms the tensioning member for the wheel brake.

The bracket 6 supports two guide rollers 9 and 10, with the first brake shoe 2 resting against these. In the zones where the first brake shoe 2 is resting against the guide rollers 9 and 10, said brake shoe is provided with inclines 11 and 12, with these inclines 11 and 12 enclosing, together with the external curvature of the brake shoe 2, a wedge surface tapering in the running-up direction of the first brake shoe 2. The running-up direction of the first brake shoe 2 corresponds to the forward rotation of the brake drum 1 as indicated in the FIGS. by the arrow marked V.

The bracket 6 is connected with the second brake shoe 3 by springs 13 exerting an inward pull, i.e., away from the brake drum 1, upon the bracket 6 as well as the second brake shoe 3. The first brake shoe 2 is connected with the bracket 6 by springs 14, being pulled inward by these springs. The abutment bearing 4 is attached on the wheel axle 15.

The cam 8, serving as tensioning member, is actuated upon overrunning by the shaft 7 supported in the anchor plate 16, or actuation is made by a hand-braking device is not shown in the drawings. FIG. 3 shows the cam 8 when not actuated, FIG. 4 shows the cam 8 in actuated state. Pivoting the cam 8 which acts upon the bracket 6 will slightly expand said bracket 6 against the brake drum and also move it in the direction of the circumference, so that upon initiation of the braking action, the pin 5 is first moved slightly in the circumferential direction so that the first brake shoe 2 will momentarily have no further contact with the pin 5. The frictional forces resulting from braking will now draw the first brake shoe 2 in the circumferential direction until it comes to a rest against the pin 5. Herein, the first brake shoe 2 will move along the inclines 11 and 12 and will thus, with a continually stronger effect, run up against the brake drum 1 so that very high braking forces will result. Tensioning required for the aforegoing need only be moderate, since due to the arrangement of the inclines 11 and 12, the first brake shoe 2 will be pressed with very high force against the brake drum 1. Due to the self-energizing arrangement of both brake shoes 2 and 3, the brake shoe 3 is also being pressed very strongly against the brake drum 1.

The moderate tensioning required for braking entails the advantage of requiring only a short overrunning travel, so that very smooth driving is made possible.

When travelling in reverse, the brake drum 1 will rotate against the direction V of the arrow as shown in the drawings, so that the brake shoes 2 and 3 are also moved along in the same direction. In this direction of travel, the first brake shoe 2 will run back along the inclines 11 and 12, i.e. the first brake shoe 2 will move away from the brake drum, and so will the brake shoe 3. Thus, there will be practically no braking resistance when travelling in reverse, although tensioning of the brake shoes having been effected.

When actuating the hand brake, greater displacement of the cam 8 will ensue than with the maximum possible overrunning travel. Such a tendency towards reverse movement arise, this increased tensioning will result in the first brake shoe being displaced over a short distance along these zones of the inclines 11 and 12 which are concentrical with the external curvature of the brake shoe 2. The brake shoe 2 will, herein, rest against the abutment bearing 4, so that the brake shoe 2 will now firmly be pressed against the brake drum 1, thus effecting an adequate hand brake action against reverse movement. In case of a possible tendency towards forward movement, the brake will act in the same manner as when actuated by overrunning.

The invention is not restricted to the embodiment shown in the drawings. It is, for example, possible that the first brake shoe 2 is made to rest only against one guide roller 9, said roller then being preferably arranged in that zone which is facing the cam 8. Resting the first brake shoe 2 against two guide rollers 9 and 10, as shown in the embodiments, will have the advantage of a better and more uniform distribution of the forces resulting from braking. This will then allow a construction which is lighter.

It would furthermore be conceivable and possible to attach the abutment bearing 4 for example by welding, not on the wheel axle 15, but rather, as usual, on the anchor plate 16, for example also by welding. It would then however become necessary to provide a very massive construction for the abutment bearing and for the anchor plate 16 supporting said abutment bearing, since the braking forces attainable by the wheel brake as per invention will be very high.

Apart from the advantages as noted already, the wheel brake as per invention will also entail the following advantages:

Since the cam 8 is eccentrically mounted on the shaft 7, this will result in a great displacement of the brake shoe relative to the brake drum, thus obviating later adjustment of the brake shoes.

Supporting the shaft 7 on the anchor plate 16 is made in a fixed manner, i.e. the tensioning cam is not supported floatingly, so that the wheel brake as per invention is also suitable for stub axles without a full center axle.

Floating support of both brake shoes 2 and 3 will result in uniform contact of the brake lining of the brake shoes against the brake drum. The wheel brake shown in the drawings and described in detail in the present explanation, has been conceived for a trailer vehicle with overrunning braking device.

A wheel brake with the characteristics of the principal claim may also be used with great advantages in a vehicle or vehicle trailer in which tensioning is effected pneumatically or hydraulically. The advantages resulting in such instances will lie in achieving very high braking forces at moderate tensioning displacement.

No limitation of the tensioning displacement by means of a stop is normally provided in vehicles or vehicle trailers having hydraulically or pneumatically actuated brakes, so that on reverse travel no braking forces will be present without actuating the braking apparatus, with very high braking forces attainable upon actuation of the braking apparatus when so required.

If the wheel brake as per invention is used in a trailer vehicle with overrunning braking apparatus, the displacement of the brake shoe relative to the brake drum is limited by a stop, so that upon reverse travel the advantage as already described will be present, i.e. that the first brake shoe may freely move along its inclines so that the braking effect will practically be nil.

In the embodiment shown, the shaft 7 on which the cam 4 is mounted, is supported on the anchor plate 16. It would, however, also be possible to support this shaft 7 at the abutment bearing 4 mounted on the wheel axle 15.

It will be understood that each of the elements described above, or two or more together, may also find a useful application in other types of constructions differing from the types described above.

While the invention has been illustrated and described as embodied in an overrunning wheel brake in self-energizing arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it or various applications without omitting features that, from the standpoint of prior art, fairly constitute essential characteristics of the generic or specific aspects of this invention.

I claim:

1. An overrunning wheel brake comprising a brake drum;

two brake shoes including a first brake shoe which, upon forward movement will be leading, and a second brake shoe;

a bracket member provided with two guiding parts arranged to support said first brake shoe so that said bracket member and said first brake shoe are movable relative to one another in a circumferential direction and said first brake shoe can also move in a radial direction relative to said bracket member, but during travelling in reverse, and first brake shoe supported by said bracket member cannot be moved in the circumferential direction by said second brake shoe, and during traveling forward said first brake shoe acts upon said second brake shoe;

a tensioning member formed as a cam and mounted eccentrically, said tensioning member acting directly on said bracket member and expanding said bracket member in direction toward said drum and acting in running up direction of said first brake shoe;

two inclines provided on said first brake shoe in the region of its contact with said guiding parts of said bracket member, said first brake shoe having an outer curvature, and said inclines of said first brake shoe forming relative to said outer curvature a wedge surface tapering in the running-up direction of said first brake shoe;

a section provided on said first brake shoe and arranged so that said inclines transit into said section as seen in the running up direction, and said section is concentrical to the outer curvature of said first brake;

an abutment member; and a displaceable pin movable in a circumferential direction relative to said brake drum arranged so that said brake shoes abut via said pin against one another and against said abutment member, said bracket member having a first end facing toward said tensioning member, and a second end facing away from the latter and abutting via said pin against said second brake shoe.

2. An overrunning wheel brake as defined in claim 1, wherein said guiding part of said bracket member is formed as a guide cam.

3. An overrunning wheel brake as defined in claim 1, wherein said guiding part of said bracket member is formed as a guide roller.

4. An overrunning wheel brake as defined in claim 1; and further comprising a shaft on which said tensioning member is eccentrically mounted, and an anchor plate, said shaft being fixedly mounted in said anchor plate.

5. An overrunning wheel brake as defined in claim 1; and further comprising a wheel axle, said abutment member being mounted on said wheel axle.

6. An overrunning wheel brake as defined in claim 1; and further comprising a shaft on which said tensioning member is eccentrically mounted, and a wheel axle on which said abutment member is mounted, said shaft being supported in said abutment member.

* * * * *